(12) United States Patent
Lin

(10) Patent No.: US 11,221,037 B2
(45) Date of Patent: Jan. 11, 2022

(54) SAFETY HOOK

(71) Applicant: Siang-Ting Lin, New Taipei (TW)

(72) Inventor: Siang-Ting Lin, New Taipei (TW)

( * ) Notice: Subject to any disclaimer, the term of this patent is extended or adjusted under 35 U.S.C. 154(b) by 0 days.

(21) Appl. No.: 16/816,881

(22) Filed: Mar. 12, 2020

(65) Prior Publication Data

US 2021/0285485 A1 Sep. 16, 2021

(51) Int. Cl.
*F16B 45/02* (2006.01)
*A63B 29/02* (2006.01)
*A62B 35/00* (2006.01)

(52) U.S. Cl.
CPC .......... *F16B 45/02* (2013.01); *A62B 35/0037* (2013.01); *A63B 29/02* (2013.01)

(58) Field of Classification Search
CPC ...... F16B 45/02; A63B 29/02; A62B 35/0037
See application file for complete search history.

(56) References Cited

U.S. PATENT DOCUMENTS

| 6,588,076 | B1 * | 7/2003 | Choate | F16B 45/02 24/599.1 |
| 6,912,836 | B2 * | 7/2005 | Hsu | F16B 45/02 24/598.1 |
| 7,320,159 | B2 * | 1/2008 | Petzl | F16B 45/02 24/599.5 |
| 8,060,994 | B2 * | 11/2011 | Petzl | F16B 45/02 24/600.2 |
| 8,276,247 | B2 * | 10/2012 | Yang | F16B 45/02 24/599.9 |
| 2003/0106190 | A1 * | 6/2003 | Christianson | F16B 45/02 24/600.1 |
| 2003/0167608 | A1 * | 9/2003 | Petzl | F16B 45/02 24/600.2 |
| 2005/0246874 | A1 * | 11/2005 | Hsu | F16B 45/02 24/598.2 |
| 2006/0137151 | A1 * | 6/2006 | Thompson | F16B 45/02 24/598.2 |
| 2011/0023275 | A1 * | 2/2011 | Thompson | F16B 45/02 24/594.1 |
| 2014/0082901 | A1 * | 3/2014 | Yeh | F16B 45/02 24/599.1 |
| 2014/0245576 | A1 * | 9/2014 | Perner | F16B 45/02 24/600.1 |
| 2018/0017095 | A1 * | 1/2018 | Chang | F16B 45/02 |

* cited by examiner

*Primary Examiner* — David M Upchurch
(74) *Attorney, Agent, or Firm* — Bacon & Thomas, PLLC

(57) ABSTRACT

A safety hook includes a hook body having an opening, a pivoting portion and a latching portion. A composite link includes a fixing rod and a guiding post. The fixing rod is pivoted at the pivoting portion, and the guiding post has a positioning portion, a sliding groove and a fastening portion. The guiding post encloses the opening through the fastening portion fastened with the latching portion. A rotating kit includes a sleeve and a pin, and the sleeve sheathes the guiding post and coupled to the composite link. A resilience component is sleeved outside the fixing rod and abutted the sleeve. The composite link is restricted when the sleeve is pushed by the resilience component.

9 Claims, 6 Drawing Sheets

SAFETY HOOK

BACKGROUND OF THE INVENTION

Field of the Invention

The present invention generally relates to fasteners and, in particular to a safety hook.

Description of Prior Art

For safety considerations, when users perform aerial work, rock climbing or mountain climbing activities, ropes (wires) are usually worn around waists of users, and then a safety hook will be attached to the rope. Furthermore, a safety hook is used to suspend the rope (wire) for supporting to avoid of accidental fall, slipping or falling on the ground to cause physical injury.

Moreover, most safety hooks at present are composed of a hook body and a lock mechanism. The hook body is provided with an opening; the lock mechanism is configured by a link, a locking cylinder sleeved on the link, a spring, and a rotating sleeve. Thereby, one side of the locking mechanism is pivotally at a side of the opening of the hook body, and the other side of the locking mechanism is selectively fastened at the other side of the opening of the hook body. However, lock mechanism of the safety hook comprises lots parts so that the cost is high and the assembly processes is complicated; thus, it does not meet the using requirements.

In view of the above drawbacks, the Inventor proposes the present invention based on his expert knowledge and elaborate researches in order to solve the problems of prior art.

SUMMARY OF THE INVENTION

Accordingly, an object of the present invention is to provide a safety hook, wherein the composite link includes a fixing rod and a guiding post, and the fixing rod is pivoted at the pivoting portion; besides, the guiding post is provided with a positioning portion, a sliding groove and a fastening portion, and a sleeve is sheathed the guiding post and movably coupled to the composite link through a pin inserting in the position portion. Thereby, the assembly structure of the safety hook is simplified.

In order to achieve the object mentioned above, the present invention provides a safety hook including a hook body, a composite link, a rotating kit and a resilience component. The hook body has an opening, and the hook body is provided with a pivoting portion and a latching portion at opposite sides of the opening. The composite link includes a fixing rod and a guiding post extended from the fixing rod. The fixing rod has one end pivoted at the pivoting portion, and the guiding post has a positioning portion, a sliding groove and a fastening portion. The sliding groove is extended from the positioning portion along an outer surface of the guiding post, and the guiding post encloses the opening through the fastening portion fastened with the latching portion. The rotating kit includes a sleeve and a pin, and the sleeve sheathes the guiding post and movably coupled to the composite link by the pin inserting the positioning portion. The resilience component is sleeved outside the fixing rod and elastically abutted the sleeve. The pin is positioned at the positioning portion for restricting the composite link when the sleeve is pushed by the resilience component.

Comparing to the prior art, the safety hook of the present invention includes a hook body, a composite link, a rotating kit and a resilience component. The composite link includes a fixing rod and a guiding post, and the guiding post is provided with a positioning portion, a sliding groove and a fastening portion; thereby, a sleeve is sheathed the guiding post and movably coupled to the composite link through a pin inserting in the position portion. Therefore, the traditional safety hook structure which requires disposing a link and a locking cylinder sleeved on the connecting rod can be replaced, so that the purposes of simplifying the structure and the assembly process can be achieved. The overall cost will be reduced, and the practicality of the invention is enhanced.

BRIEF DESCRIPTION OF DRAWINGS

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

Figure 1:
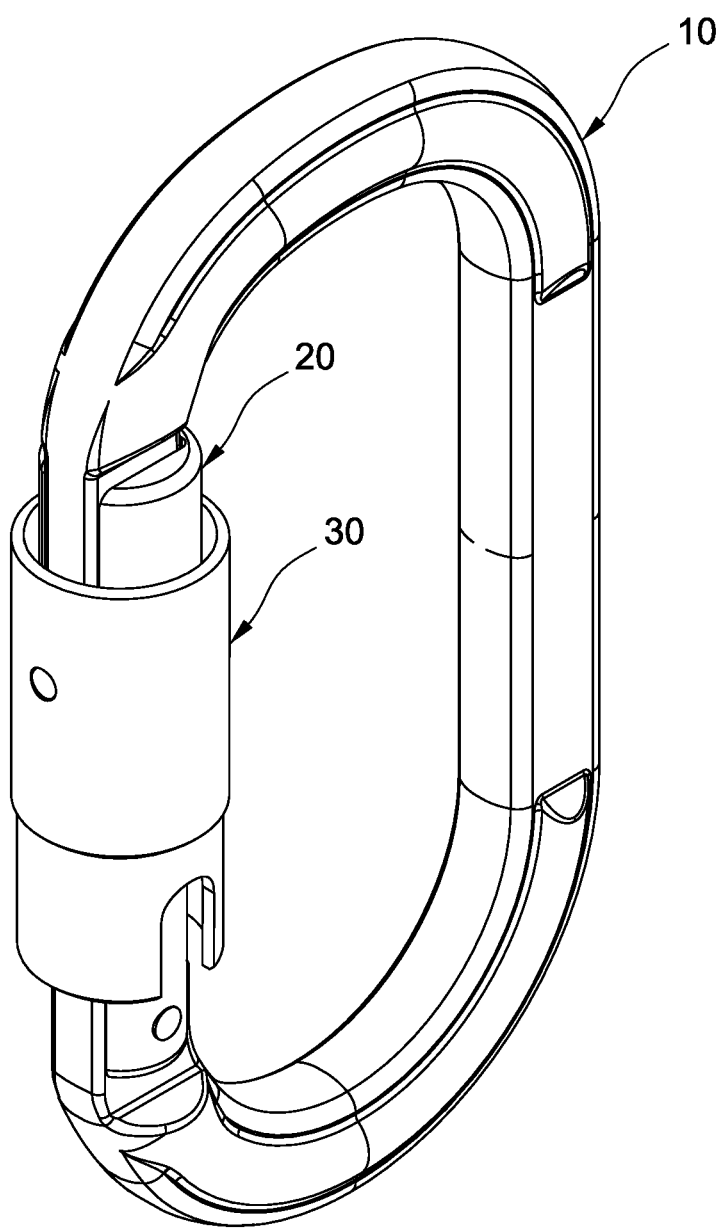
FIG. 1 is a perspective schematic view of the safety hook of the present invention.
Figure 2:
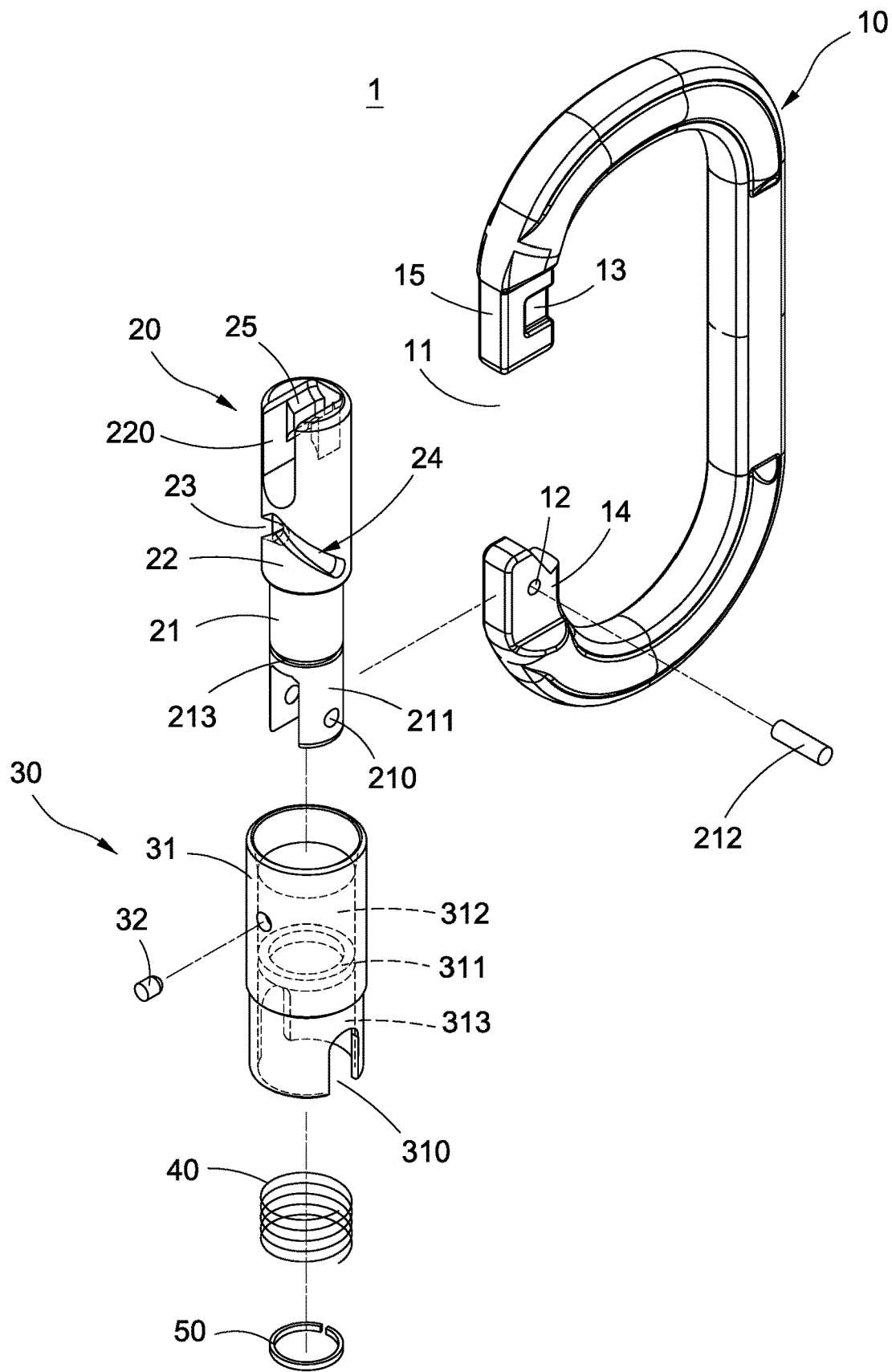
FIG. 2 is a perspective explosion schematic view of the safety hook of the present invention.
Figure 3:
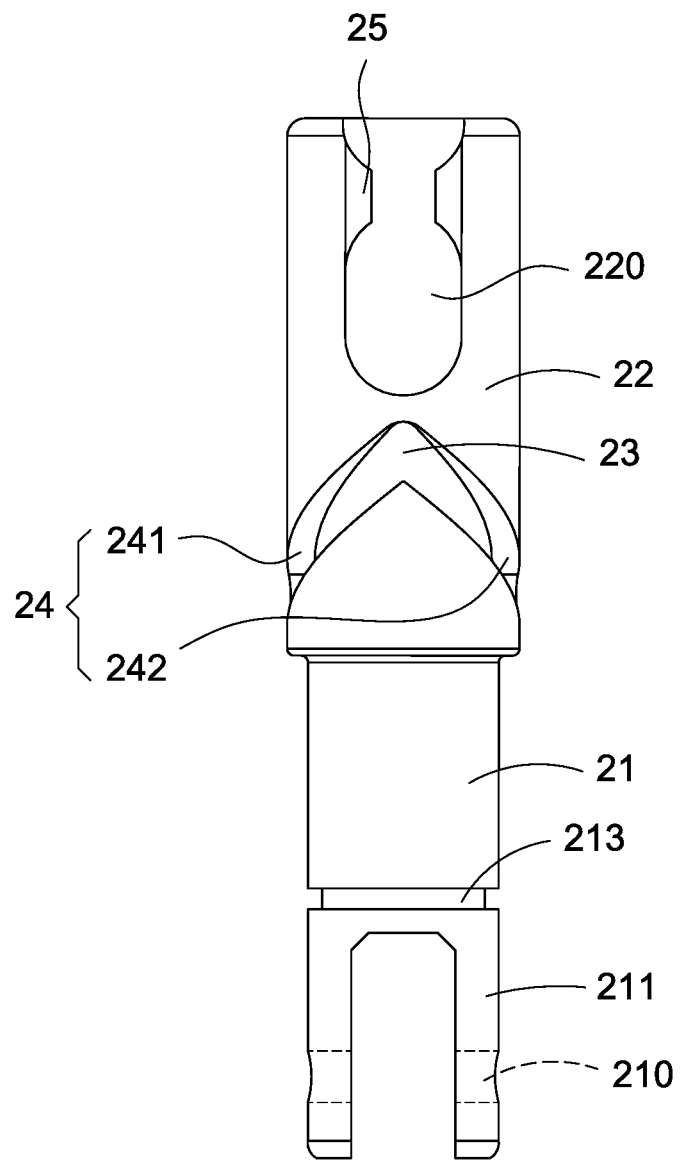
FIG. 3 is a front view of the composite link of the present invention.
Figure 4:
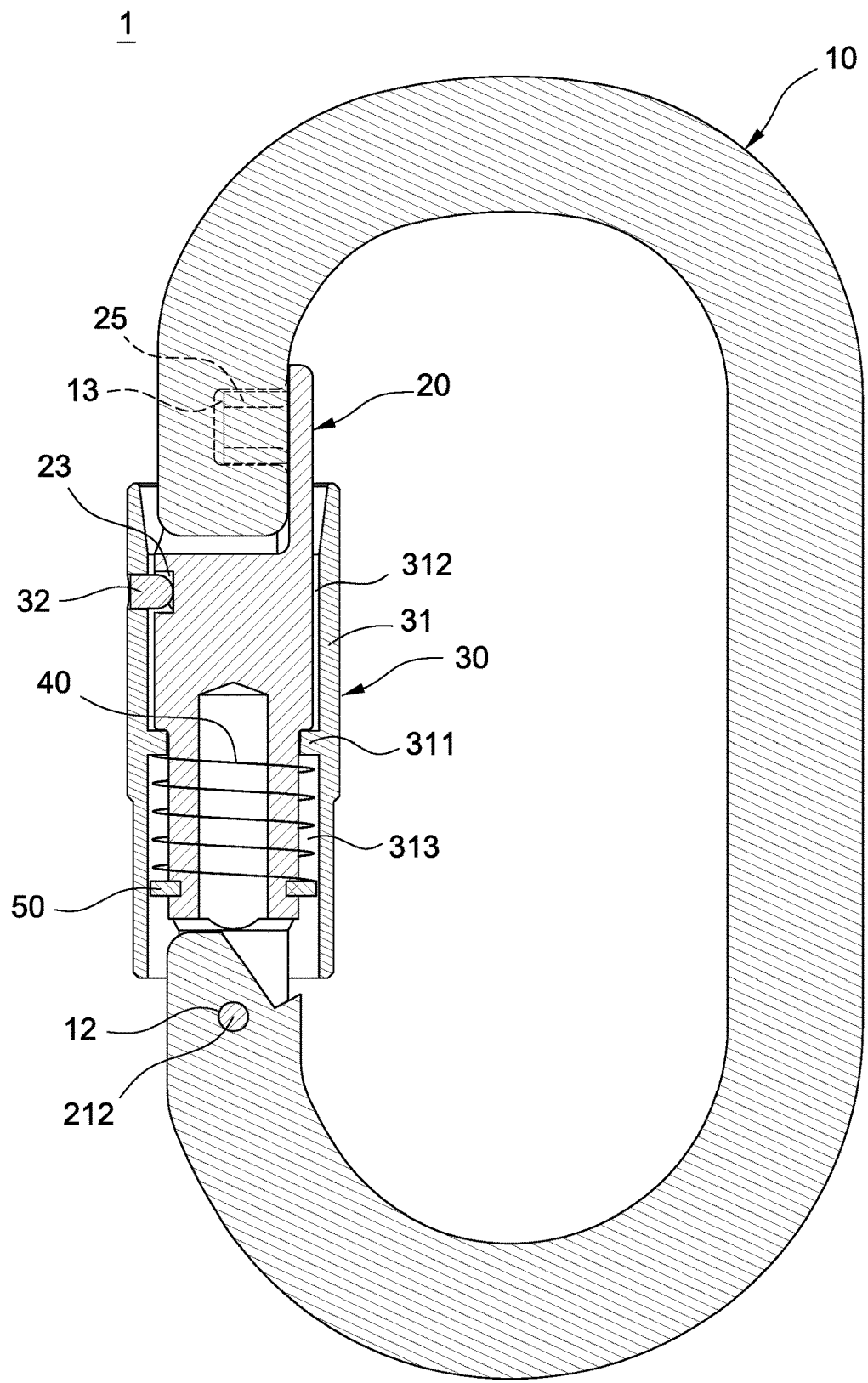
FIG. 4 is a cross sectional view of the safety hook of the present invention.

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Please refer to FIG. 1 to FIG. 4, which depict a perspective schematic view of the safety hook of the present invention, an explosion schematic view of the safety hook of the present invention, a front view of the composite link of the present invention and a cross sectional view of the safety hook of the present invention. The present invention is a safety hook 1 comprising a hook body 10, a composite link 20, a rotating kit 30 and a resilience component 40. The composite link 20 has an end pivoted at the hook body 10. The rotating kit 30 is combined to the composite link 20, and the resilience component 40 is disposed between the composite link 20 and the rotating kit 30 to constitute the safety hook 1. The structure of the safety hook 1 is described in more detail as follows.

The hook body 10 is in a C shape and has an opening 11, and the hook body 10 is provided with a pivoting portion 12 and a latching portion 13 at opposite sides of the opening 11. In the present embodiment, the pivoting portion 12 is a first pivoting hole, and the latching portion 13 includes a pair of latching slots. Specifically, the hook body 10 has a pivoting block 14 at one end and a latching block 15 at the other end. Besides, the pivoting portion 12 is arranged on the pivoting block 14, and the latching portion 13 is disposed at an opposite side of the latching block 15.

The composite link 20 includes a fixing rod 21 and a guiding post 22 extended from the fixing rod 21. Preferably, a diameter of the fixing rod 21 is smaller than that of the guiding post 22. In addition, the fixing rod 21 has one end pivoted at the pivoting portion 12. The guiding post 22 has a positioning portion 23, a sliding groove 24 and a fastening portion 25. The sliding groove 24 is extended from the positioning portion 23 along an outer surface of the guiding post 22. The guiding post 22 encloses the opening 11 through the fastening portion 25 fastened with the latching portion 13.

In more detail, the fixing rod 21 has one end provided with a pair of fixing sheets 211, and the pair of the fixing sheets 211 has a pair of second pivoting holes 210. The fixing rod 21 is pivotally connected with the hook body 10 through a pivoting shaft 212 inserting the pair of second pivoting holes 210 and the pivoting portion 12 (the first pivoting hole).

In one embodiment of the present invention, the positioning portion 23 is a notch. The sliding groove 24 includes a left-handed groove 241 rotating downward from the positioning portion 23 (notch) and a right-handed groove 242 rotating downward from the positioning portion 23 (refer to FIG. 3).

Preferably, the fastening portion 25 includes a pair of bumps; besides, the guiding post 22 has an opening slot 220 at one side thereof, and the pair of bumps are disposed in the opening slot 220. Thus, the latching block 15 is inserted in the opening slot 220 so that the fastening portion 25 (bumps) are clamped in the latching portion 13 (latching slots) correspondingly.

The rotating kit 30 includes a sleeve 31 and a pin 32. The sleeve 31 sheathes the guiding post 22 and movably coupled to the composite link 20 by the pin 32 inserting the positioning portion 23. It is worthy to note that the pin 32 is fixed in the sleeve 32. Furthermore, the sleeve 31 has a pair of yielding grooves 310 corresponding to the pivoting block 14, and the pair of yielding grooves 310 are provided for positioning the sleeve 31 after rotating.

Moreover, the resilience component 40 is sleeved outside the fixing rod 21 and elastically abutted the sleeve 31. The pin 32 is positioned at the positioning portion 23 for restricting the composite link 20 when the sleeve 31 is pushed by the resilience component 40. In the present embodiment, the resilience component 40 is, but not limited to, a compression spring. In real practice, the resilience component 40 can be a torsion spring.

In the present embodiment, the safety hook 1 further includes a C-ring 50. In addition, the fixing rod 21 has a ring-groove 213. The C-ring 50 is embedded in the ring-groove 213 and abutted the resilience component 40.

Furthermore, the sleeve 31 has an internal space and a flange 311 on an inner wall thereof, and the internal space is separated into a first receiving space 312 and a second receiving space 313 by the flange 311. The guiding post 22 is accommodated in the first receiving space 312, and the resilience component 40 is sleeved on the fixing rod 21. One side of the resilience component 40 is elastically abutted the flange 311 of the sleeve 31 and the other side abutted the C-ring 50. Thereby, the resilience component 40 is disposed between the composite link 20 and the rotating kit 30 and located in the second receiving space 313.

Figure 5:
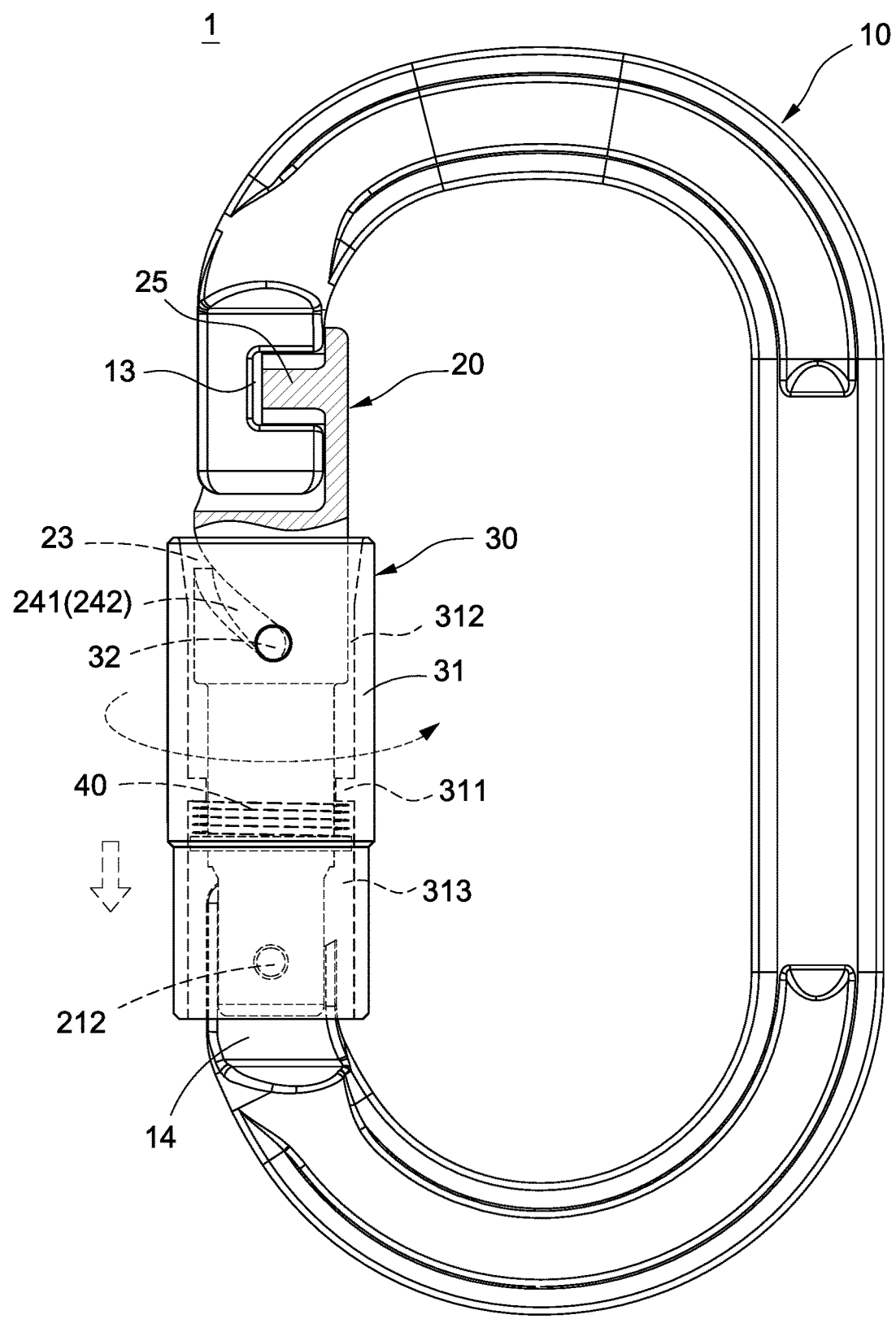
FIG. 5 is a rotating schematic view of the sleeve of the present invention.
Figure 6:
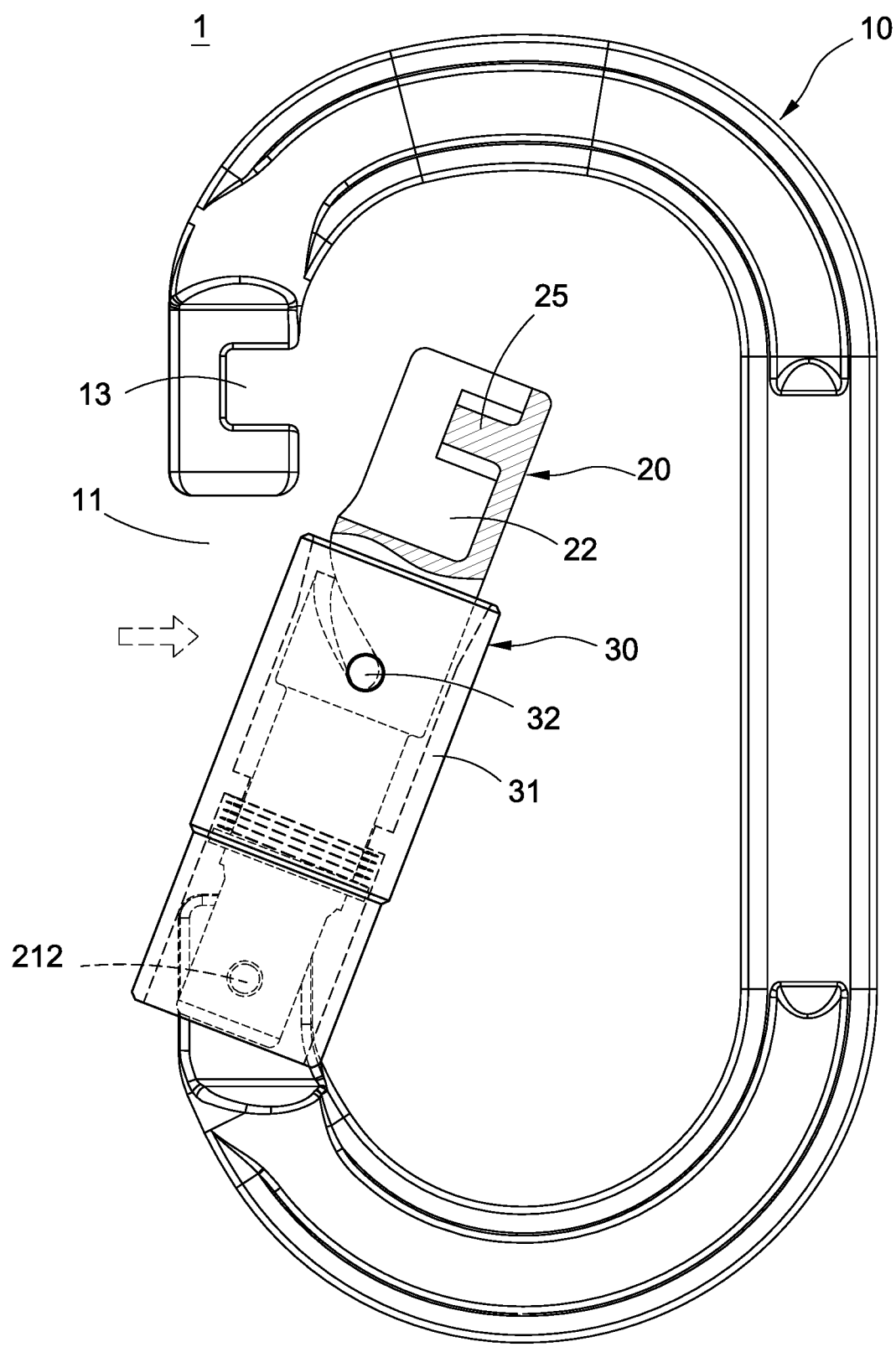
FIG. 6 is an operation schematic view if the composite link of the present invention.

Please also refer to FIG. 5 and FIG. 6, they depict a rotating schematic view of the sleeve of the present invention and an operation schematic view of the composite link of the present invention. When using the safety hook 1, the opening 11 of the hook body 10 needs to be opened. Firstly, pushing the sleeve 31 from the latching block 15 to the pivoting block 14, and the pin 32 will be driven away from the positioning portion 23. At the time, the sleeve 31 can be rotated. Then, the sleeve 31 is rotated and the resilience component 40 is compressed. Therefore, the pin 32 can selectively enter the path of the left-handed groove 241 or the right-handed groove 242, so that the sleeve 31 can be moved toward the pivoting block 14 to detach from the guide post 22.

Next, the sleeve 31 is rotated to expose the guiding post 22, the composite link 20 and the sleeve 31 can be pushed, and the fastening portion 25 of the guiding post 22 can be released from the fastening of the fastening portion 13. Accordingly, the composite link 20 can be rotated by the pivot 212 as a fulcrum to open the opening 11, and then a rope (not shown) can be placed in the hook body 10.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A safety hook, comprising:
   a hook body having an opening, the hook body provided with a pivoting portion and a latching portion at opposite sides of the opening;
   a composite link including a fixing rod and a guiding post extended from the fixing rod; the fixing rod having one end pivoted at the pivoting portion; the guiding post having a positioning portion, a sliding groove and a fastening portion; the sliding groove extended from the positioning portion along an outer surface of the guiding post, and the guiding post enclosing the opening through the fastening portion fastened with the latching portion;
   a rotating kit including a sleeve and a pin, the sleeve being adapted to sheathe the guiding post and movably coupled to the composite link by the pin inserting the positioning portion; and
   a resilience component sleeved outside the fixing rod and elastically abutted the sleeve, the pin being positioned at the positioning portion for restricting the composite link when the sleeve is pushed elastically by the resilience component,
   wherein the latching portion includes a pair of latching slots, and the fastening portion includes a pair of bumps.

2. The safety hook according to claim 1, wherein the hook body is in a C shape.

3. The safety hook according to claim 1, wherein the pivoting portion is a first pivoting hole; the fixing rod has one end provided with a pair of fixing sheets, and the pair of the fixing sheets has a pair of second pivoting holes; the fixing rod is pivotally connected with the hook body through a pivoting shaft inserting the pair of second pivoting holes and the pivoting portion.

4. The safety hook according to claim 3, wherein the hook body has a pivoting block at one end, and the pivoting portion is arranged on the pivoting block; the sleeve has a pair of yielding grooves corresponding to the pivoting block.

5. The safety hook according to claim 1, wherein the hook body has a latching block at one end, and the latching portion is disposed at opposite sides of the latching block; the guiding post has an opening slot at one side thereof, and the pair of bumps are disposed in the opening slot; the latching block is inserted in the opening slot so that the pair of bumps are clamped in the pair of latching slots correspondingly.

6. The safety hook according to claim 1, wherein the positioning portion is a notch; the sliding groove includes a left-handed groove rotating downward from the positioning portion and a right-handed groove rotating downward from the positioning portion.

7. The safety hook according to claim 1, wherein a diameter of the fixing rod is smaller than that of the guiding post.

8. The safety hook according to claim 1, wherein the sleeve has an internal space and a flange on an inner wall thereof, and the internal space is separated into a first receiving space and a second receiving space by the flange; the guiding post is accommodated in the first receiving space, and the resilience component is located in the second receiving space.

9. The safety hook according to claim 1, further including a C-ring, wherein the fixing rod has a ring-groove, and the C-ring is embedded in the ring-groove and abutted the resilience component.

* * * * *